United States Patent [19]
Haberzeth

[11] Patent Number: 5,368,251
[45] Date of Patent: Nov. 29, 1994

[54] INERTIAL REEL ASSEMBLY FOR A SAFETY BELT

[75] Inventor: Thomas Haberzeth, Munich, Germany

[73] Assignee: Autoliv-Kolb GmbH & Co., Dachau, Germany

[21] Appl. No.: 752,473

[22] PCT Filed: Feb. 22, 1990

[86] PCT No.: PCT/EP90/00303

§ 371 Date: Aug. 20, 1991

§ 102(e) Date: Aug. 20, 1991

[87] PCT Pub. No.: WO90/09910

PCT Pub. Date: Sep. 7, 1990

[30] Foreign Application Priority Data

Feb. 24, 1989 [DE] Germany ............... 3905804

[51] Int. Cl.$^5$ .................................. B60R 22/40
[52] U.S. Cl. ...................................... 242/382.6
[58] Field of Search ............. 242/107.4 A, 107.4 C, 242/107.4 B; 280/806, 808

[56] References Cited

U.S. PATENT DOCUMENTS 4,506,844 3/1985 Ernst ............... 242/107.4 A
4,619,418 10/1986 Butenop ............ 242/107.4 C
4,834,313 5/1989 Tsukamoto ....... 242/107.4 C

FOREIGN PATENT DOCUMENTS 8908570 9/1989 European Pat. Off. .
2646238 4/1978 Germany ......... 242/107.4 C
3421960 12/1985 Germany .
3418378 2/1986 Germany .
3437693 4/1986 Germany .
3920333 1/1991 Germany ......... 242/107.4 C

*Primary Examiner*—John M. Jillions
*Attorney, Agent, or Firm*—Morgan & Finnegan

[57] ABSTRACT

An inertial reel assembly for use with a safety belt. The reel assembly includes a spindle portion rotatably mounted within a housing for take up and pay out of the safety belt. The spindle is formed with plurality of teeth which engage and lock with the plurality of teeth formed within the interior of the housing. The spindle is mounted to move along an arc passing through its center point so that the spindle teeth may lock with the housing teeth. The housing teeth may include a flat section formed at the tips of the housing teeth for preventing the engagement of the spindle teeth with corresponding housing teeth when the spindle teeth are angularly misaligned with respect to the housing teeth.

16 Claims, 3 Drawing Sheets

INERTIAL REEL ASSEMBLY FOR A SAFETY BELT

BACKGROUND OF THE INVENTION

FIELD OF THE INVENTION

The invention relates to an inertial reel assembly for a safety belt with a rotatably mounted spindle for taking up and paying out the belt which is to be drawn out against the force of a spring, comprising at least one sensor device, which responds to a rate of vehicle deceleration above a certain value, the spindle preferably bearing teeth at both ends and performing a translatory or pivotal movement for locking so that the spindle teeth engage housing teeth.

SUMMARY OF THE INVENTION

Such a safety belt inertial reel assembly is for instance described in the German patent publication 3,418,378 A. In the case of this known inertial reel assembly the base plate of the mechanism is permanently attached to a limb of a frame. A journal serves as a pivot for an operating disk. The spindle, which is supported in this operating disk, is furthermore permanently connected with an operating wheel. If now one of the sensors provided is triggered, the operating wheel is latched to the operating disk by a pawl. If more belt is paid out, the operating disk will now turn with the spindle about the journal and the teeth on the spindle will come into engagement with the housing teeth in the limbs of the frame. In the case of this known belt take up assembly, angular alignment during engagement movement with respect to the teeth connected with the housing is ensured owing to the locked state of the operating wheel in relation to the operating disk.

In use it may happen that shortly before an accident the operating wheel is in a position in which triggering of a sensor would mean that the corresponding pawl would so drop onto the back of a tooth and so engage the operating wheel that the spindle has to turn through one tooth pitch before the operating wheel is locked. In the case of a sudden, jerked paying out of belt as occurs in the case of a crash, the great inertia of the spindle will mean that the spindle will be more rapidly jerked upwards so than it is turned the corresponding amount. The consequence is angular misalignment during engagement with the housing teeth. In this respect it may happen that the spindle teeth are not completely in alignment with the teeth connected with the housing and in an extreme case, although the known reel just keeps to requirements, it only does so marginally.

Therefore the object of the invention is to achieve a complete overlap of the spindle teeth with the housing teeth even in this extreme case of angular misalignment of the spindle and thus to provide for the transmission of a great force.

This object is achieved since the housing teeth have flats, which prevent a coming into engagement of the spindle teeth in the angularly misaligned state. In accordance with a preferred embodiment of the invention the spindle is so supported that on coming into engagement with the housing teeth it pivots about a point fixed in relation to the housing, which is on a circle about the center point of the spindle in its inactive position and having a radius equal to the pitch circle diameter. In the case of a positioning of the housing teeth wherein the center of the housing teeth is located on a line drawn through the center point of the spindle in its engaged position, which line itself is perpendicular to the line connecting this center point with the pivot point of the spindle, it is possible for the part, which bears the teeth, to be largest so that the force may best be transmitted from the spindle to the sheet metal frame. The first tooth of the set of housing teeth has to be so positioned that the spindle is able to turn without obstruction in its neutral condition and even in the case of a minimum pivoting angle does not immediately come into engagement with the housing teeth. The last housing tooth has to be so arranged that the spindle is still able to swing freely into and out of engagement. The first third of the housing teeth has a flat. If the spindle is jerked upwards in the angularly misaligned state, the spindle teeth will land on the flats of the housing teeth and engagement is prevented. Were it not for these flats in accordance with the invention the spindle would engage even starting from this angularly misaligned state and the load would only be transmitted to the last housing teeth. In the case of a very high load this may lead to stripping of the last teeth and thus to the spindle slipping. However on the other hand in the case of the teeth in accordance with the invention the spindle is prevented by the flats from making misaligned engagement. In the case of further paying off of the belt the spindle teeth will slide so far onto the flats of the housing teeth that an angularly aligned position is reached. In order in this case as well to prevent the spindle from hooking onto the last housing teeth, these teeth as well have flats. When the angularly aligned position is reached and the spindle is still under load, it will come into complete engagement. The force may now be transmitted over the entire teeth from the spindle to the sheet metal frame.

It is an advantage if the spindle teeth are so designed that they also have flats, which are aligned with tip circle of the spindle. This makes it possible to effect better sliding on the flats of the housing teeth. This is also the possibility of making the angle of the housing teeth smaller than the corresponding angle of the housing teeth. This means that during engagement there will be some play between the two sets of teeth so that the time, which is available for the engagement of the teeth, is prolonged. In the case of a particularly advantageous design in accordance with the invention the housing teeth are offset by half the tooth pitch on the two sides of the sheet metal frame. The sheet metal frame is so designed that the teeth or the entire limb may readily deform under toad. When, as normally the case, the spindle is lifted at both ends, it will come into complete engagement at that end, at which its teeth are nearest to the aligned position. On further tension the sheet metal frame or the teeth will deform to such an extent that the other end will come into the aligned position and will also engage. If however the spindle is unevenly lifted, for instance owing to oblique pull on the belt, so that it will engage first at one end, in the case of a symmetrical arrangement of the housing teeth the spindle teeth on the end with the lag would already be past their aligned position and the end with the lead would have to be deformed by an entire tooth pitch before the second end could engage. Owing to the offset by half the tooth pitch there will be—even in the limiting extreme—a deformation by one half of the tooth pitch takes place. Therefore engagement at both ends to completely transmit the load is ensured.

BRIEF DESCRIPTION OF THE DRAWINGS

The invention will now be described in more detail with reference to the drawing.

DESCRIPTION OF THE DRAWINGS

Figure 1:
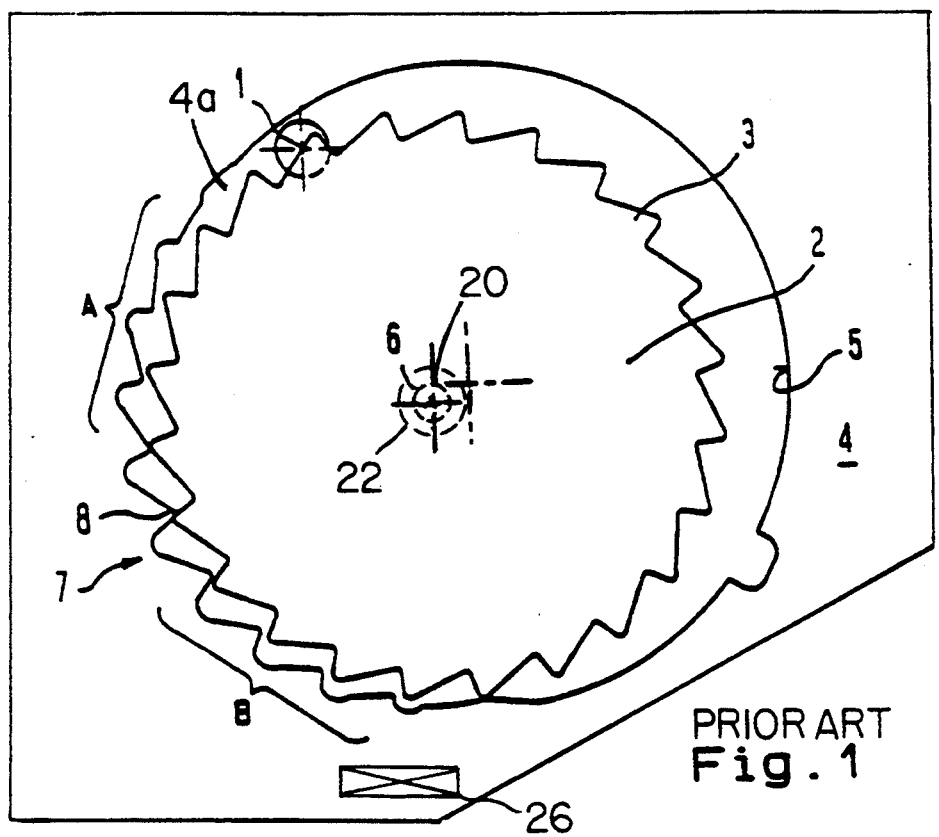
FIG. 1 shows a conventional spindle and housing tooth system in the course of engagement starting from an angularly misaligned position.

FIG. 1 serves to show an inertial reel assembly in which a spindle, 20 for a coil of safety (not shown) belt is supported for rotation against the force of a spring 22 about the pivot point 1. A spindle disk 2 is locked in rotation with the spindle 20 and it bears spindle teeth 3. A cutout 5 is provided in the sheet metal frame or housing 4 having a backwall 4a to receive the disk 2 with the teeth 3 thereof so that it may freely rotate about its axis 6 in the neutral position. The back wall 4a of the housing is at least partially cut away to form limbs 24 and at least one sensor device 26 which responds to a rate of deceleration above a certain value is cooperatively connected to the assembly in a conventional manner to activate the assembly. The teeth 7 of the housing 4 are of conventional design. If now the spindle is pivoted with angular misalignment towards its locked position it is possible for the condition illustrated in FIG. 1 to arise. In the part A of the teeth 7 on the housing the spindle teeth 3 have already moved past the tooth tips. In the part B of the housing teeth 7, on the other hand, the spindle teeth 3 have not yet reached the tips of the housing teeth so that at this instant there is merely one engagement at the housing tooth 8. When further safety belt is paid out, which compels further movement in the engagement direction of the spindle, the spindle tooth 8 will deform to such an extent that in an extreme case the two following teeth will engage with the spindle teeth. If now a very high load occurs, which is not able to be resisted by the teeth which are in the engaged condition, the first thing to happen is that the tooth 8 will be stripped. Although then the next tooth will come into engagement with the spindle teeth, the load will however only be transmitted by three of the housing teeth 7 at the most. As a result of this the teeth on the housing will be stripped off one after the other and the spindle not be held.

Figure 2:
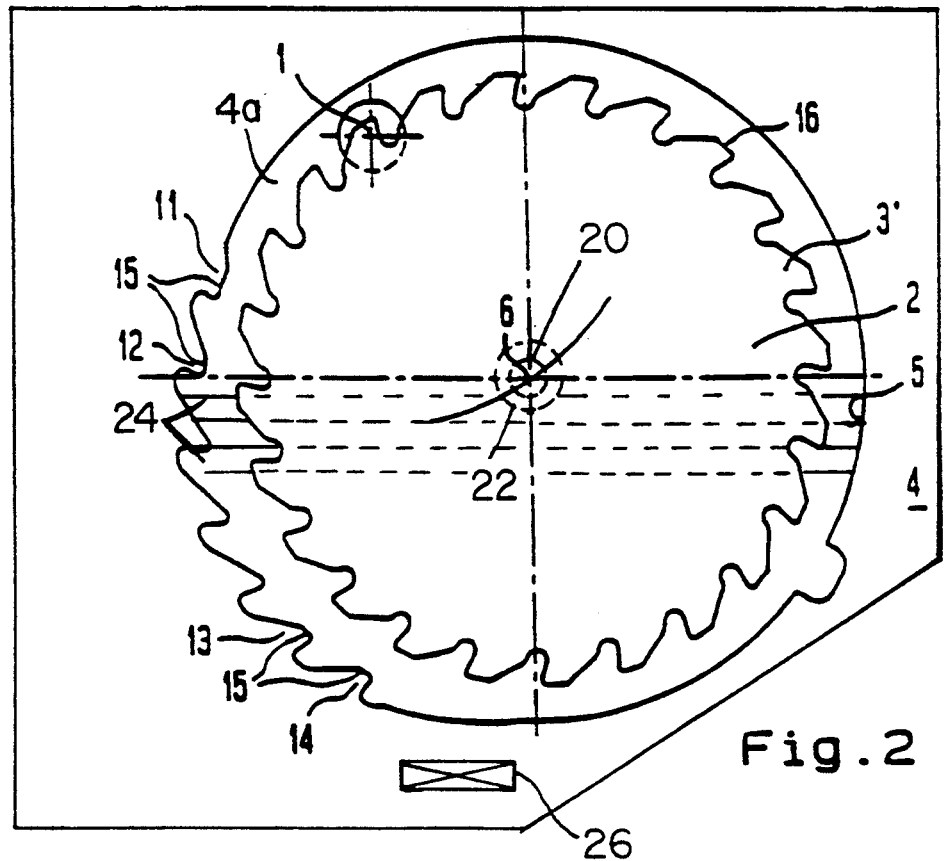
FIG. 2 shows the spindle and housing tooth arrangement in accordance with the invention in the neutral position.

In the figures the teeth arrangement in accordance with the invention is illustrated taking into account the same functional principle as in FIG. 1. In FIG. 2 the neutral position of the spindle is illustrated. The spindle disk 2, which bears the spindle teeth 3', is able to freely rotate about its axis 6 when the belt is paid out and taken up. The teeth 11 through 14 of the housing are in this case provided with flats 15. Furthermore each of the spindle teeth 3' are provided with flats 16, the flats 16 themselves tangentially aligned with a tip circle 10 radially defined from spindle axis 6 to the flats 16 at the tip of each of the spindle teeth.

Figure 3:
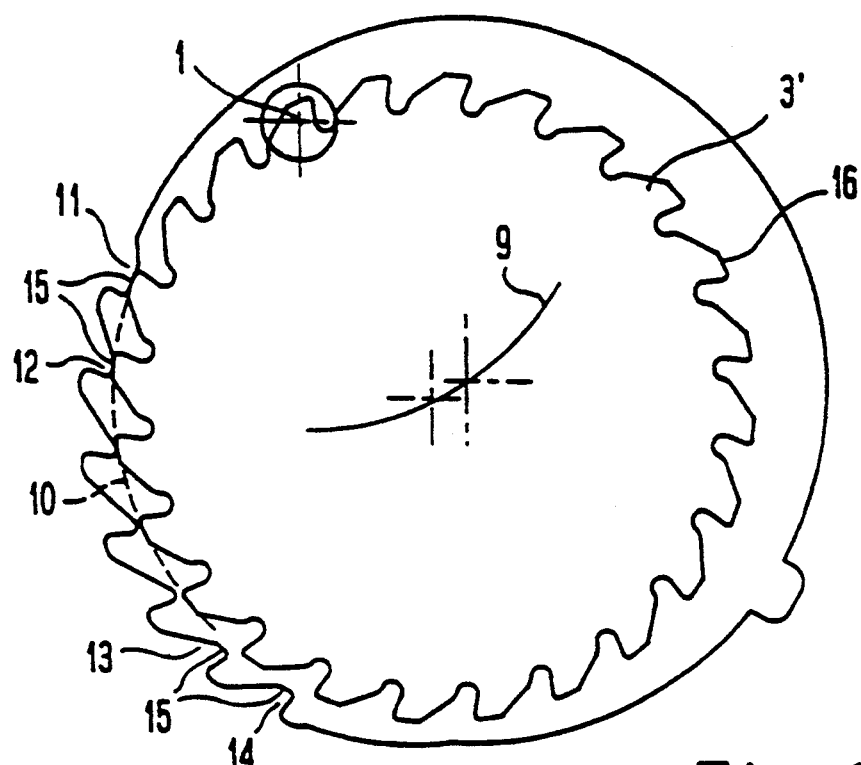
FIG. 3 shows the spindle in accordance with FIG. 2 with angular misalignment and attempted engagement.
Figure 4:
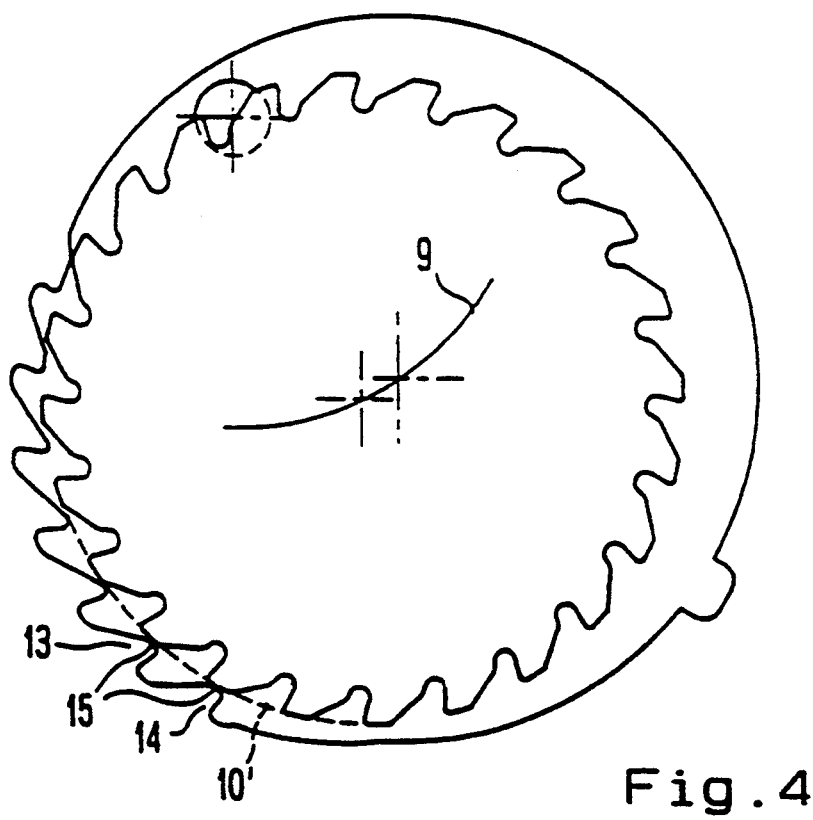
FIG. 4 shows the spindle in accordance with FIG. 3 after further rotation and further pivoting.
Figure 5:
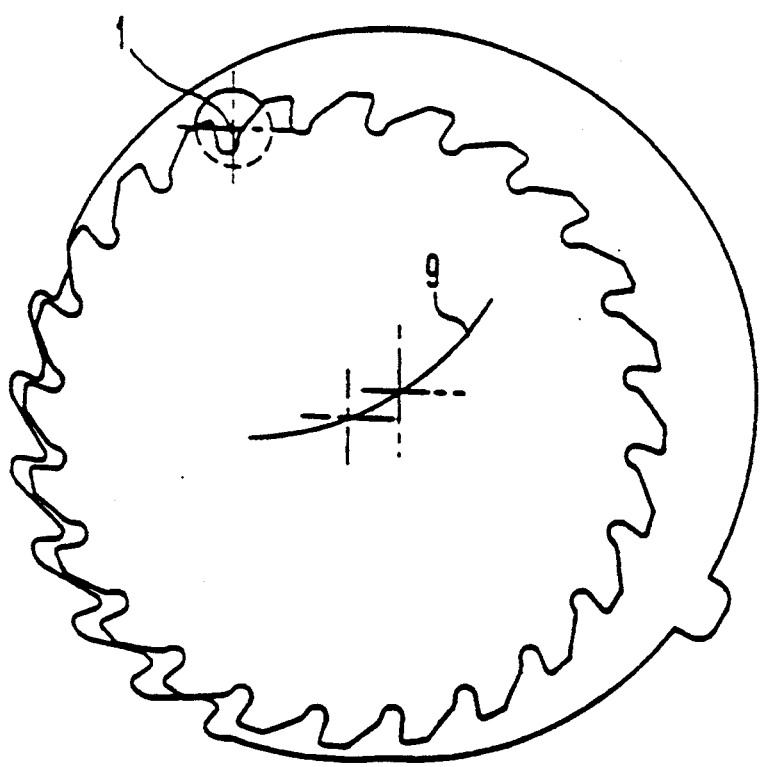
FIG. 5 shows the teeth on the spindle and the housing as in FIGS. 2 through 4 in the angularly aligned position and shortly before final engagement of the teeth.

In FIG. 3 the spindle is shown jerked upwards in the angularly misaligned position. In this case it has been pivoted along the circular path 9 about the point 1 till the flats 16 of the spindle teeth 3' engage the flats 15 of the housing teeth 11 and 12. The flats 15 are exactly on the tip circle 10 shown in broken lines of the spindle teeth 3' in this position. Therefore the spindle is prevented from pivoting further about the point 1. Furthermore the teeth 13 and 14, past which the spindle teeth have not yet moved in the illustrated position, are provided with a flat 15 so that in this case it is not yet possible for the teeth to engage. The exact form of the flat 15 on the teeth 13 and 14 will be seen from FIG. 4. The spindle has in this case been further turned to such an extent that the part of the spindle teeth, which in FIG. 3 is adjacent to the flats of the teeth 11 and 12, has already run past the same and it is possible for the spindle to pivot further along the path 9 a small distance. The flats 15 of the teeth 13 and 14 will now be on the tip circle 10' shown in broken lines, of the spindle in this position. On further rotation of the spindle in FIG. 5 these flats 15 of the housing teeth 13, 14 are passed by the spindle teeth and the spindle will reach its angularly aligned position. It is now possible for the spindle to pivot further about the point 1 in FIG. 6 for complete engagement with the housing teeth 7'.

Figure 6:
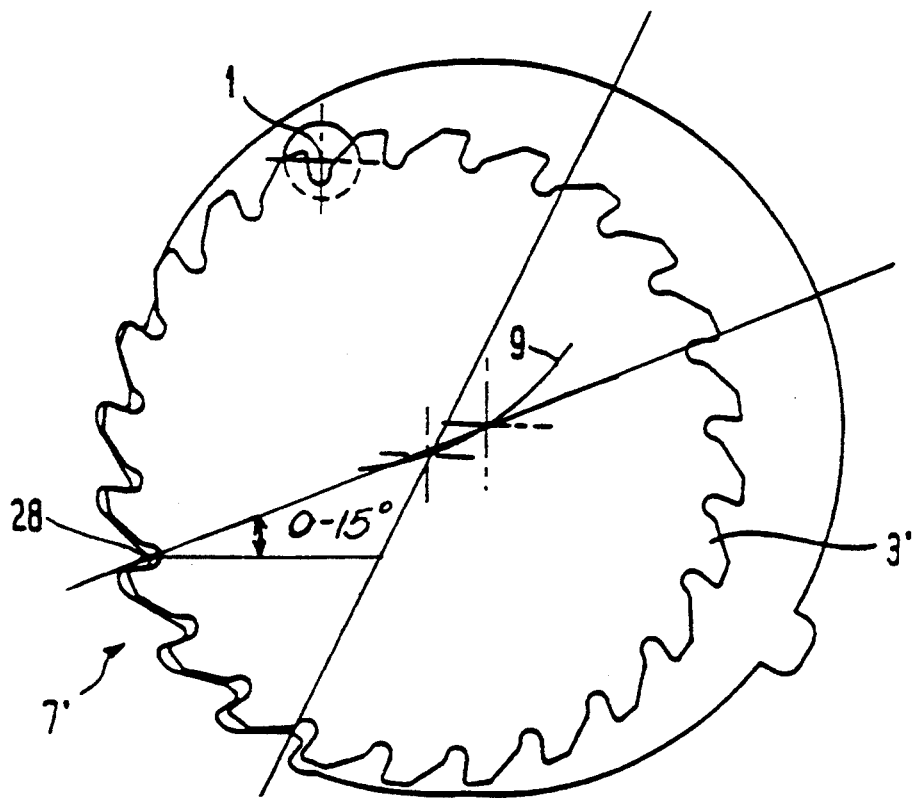
FIG. 6 shows the teeth on the spindle and the housing in full engagement.

In this condition the load, which acts on the spindle, will be transmitted by all teeth to the sheet metal frame. The flanks transmitting the load of the spindle and housing teeth are slightly undercut to an angle in a range of about 0° to 15° on their locking flanks as shown in FIG. 6 by numeral 28 in order to prevent the spindle teeth being forced by a very high load out of engagement with the housing teeth and on the other hand to ensure that on pivoting into the engagement position the spindle teeth reliably come into engagement with the housing teeth.

I claim:

1. An inertial reel assembly for a safety belt with a spindle disk rotatably mounted within a housing for taking up and paying out a belt which is to be drawn out against the force of a spring, said spindle disk having a center point, and said inertial reel assembly comprising at least one sensor device which responds to a rate of vehicle deceleration above a certain value, the spindle disk bearing teeth and performing a translatory movement along an arc passing through the center point thereof to a locking position so that the spindle teeth engage a plurality of teeth formed in said housing, characterized in that one or more of said plurality of said housing teeth include a flat section at the tip of said housing teeth for preventing engagement of said spindle teeth with said housing teeth when said spindle disk has pivoted along said center point to translate said spindle disk along said arc so that said spindle teeth are angularly misaligned with respect to said housing teeth, wherein said spindle teeth are formed as blunt teeth, and flat sections are formed on the tip circle of the blunt teeth.

2. The inertial reel assembly for a safety belt as claimed in claim 1, characterized in that during engagement with the housing teeth the spindle disk pivots about a point fixed in relation to the housing, such point being on a circle about the center point of the spindle disk when said spindle is in a neutral position, said circle having a radius equal to a pitch circle diameter of said spindle disk.

3. The inertial reel assembly for a safety belt as claimed in claim 2, characterized in that said housing teeth are formed along a circle defined by a center, said center lying on a line drawn through said center point of said spindle disk when said spindle disk is in an engaged position, said line perpendicular to the line connecting said center point with the pivot point of the spindle disk.

4. The inertial reel assembly for a safety belt as claimed in claim 3, characterized in that the housing teeth begin approximately 20° from the pivot point in the direction of winding up the safety belt.

5. The inertial reel assembly for a safety belt as claimed in claim 3, characterized in that the plurality of teeth formed in the housing includes a last housing tooth with which the spindle teeth may engage, said last housing tooth including a non-locking flank portion, which makes an angle of not less than 90° with a line connecting the pivot point of the spindle disk with a point on said housing tooth flank which simultaneously constitutes a point on the root circle of the housing teeth.

6. The inertial reel assembly for a safety belt as claimed in claim 5, characterized in that the root circle of the housing teeth is on the tip circle of the spindle disk teeth when the spindle disk is translated inwardly towards the housing and in that at least the base of the housing teeth has a configuration adapted to the teeth of the spindle disk.

7. The inertial reel assembly for a safety belt as claimed in claim 6, characterized in that the angle formed by a back portion of each of the spindle teeth which engages corresponding housing teeth is smaller than a corresponding angle of the housing teeth.

8. The inertial reel assembly for a safety belt as claimed in claim 1, characterized in that approximately a first third of the housing teeth has a flat section, which is located on the tip circle of the spindle teeth when the spindle disk is translated inwardly to engage approximately the first third of the housing teeth with the spindle teeth.

9. The inertial reel assembly for a safety belt as claimed in claim 8, characterized in that some of the remaining two-thirds of the housing teeth also has a flat section, each flat section located on the tip circle of the spindle teeth when the spindle disk has been translated inwardly along the arc to a point where there is still room for a small degree of inward translatory motion until said locking position is reached, said some of the remaining two-thirds housing of said housing teeth being those teeth whose tips come into engagement with the spindle teeth just short of said locking position upon further inward translatory motion of said spindle disk.

10. The inertial reel assembly for a safety belt as claimed in claim 9, characterized in that the spindle teeth have undercuts in the range of 0° to 15° on their locking flanks.

11. The inertial reel assembly for a safety belt as claimed in claim 9, characterized in that the spindle teeth are formed as blunt teeth, and the flat sections are formed on the tip circle of the blunt teeth.

12. The inertial reel assembly for a safety belt as claimed in claim 1, further comprising means for subjecting the housing to an elastic deformation after said spindle disk is positioned for engagement to permit further rotation of the spindle disk in the direction of payout of the safety belt through an amount equal to the length of one tooth.

13. The inertial reel assembly for a safety belt as claimed in claim 12, characterized in that cutouts are provided in a portion of the sheet metal frame covering the housing teeth and said cutouts allow a displacement of the housing teeth in relation to said sheet metal frame when said housing teeth are subjected to a load.

14. The inertial reel assembly for a safety belt as claimed in claim 12, characterized in that one or more limbs of the sheet metal frame are attached to a back wall of the housing, to permit a slight bending of the limbs of the frame in relation to a back wall of the housing when said housing teeth are subjected to a load.

15. The inertial reel assembly for a safety belt as claimed in claim 12, characterized in that the spindle teeth on one side of the spindle disk are offset by half the tooth pitch in relation to an opposed side of said spindle disk.

16. The inertial reel assembly for a safety belt as claimed in claim 12, characterized in that the housing teeth on one side of the housing are offset by half a tooth pitch in relation to any opposed side of the housing.

* * * * *